(12) United States Patent
Anderson et al.

(10) Patent No.: US 9,856,027 B2
(45) Date of Patent: Jan. 2, 2018

(54) AIR DATA PROBE WITH DOUBLE HELICAL COIL HEATER CABLE

(71) Applicant: Honeywell International Inc., Morristown, NJ (US)

(72) Inventors: Morris Anderson, Mesa, AZ (US); Grant A. Gordon, Peoria, AZ (US); Yates Wong, Humboldt, AZ (US); Richard Bonvouloir, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 99 days.

(21) Appl. No.: 14/878,650

(22) Filed: Oct. 8, 2015

(65) Prior Publication Data

US 2017/0101190 A1 Apr. 13, 2017

(51) Int. Cl.
| | |
|---|---|
| *B64D 15/12* | (2006.01) |
| *B64D 15/14* | (2006.01) |
| *B64D 43/00* | (2006.01) |
| *H05B 3/56* | (2006.01) |
| *G01P 5/165* | (2006.01) |

(52) U.S. Cl.
CPC .............. *B64D 15/12* (2013.01); *B64D 15/14* (2013.01); *B64D 43/00* (2013.01); *G01P 5/165* (2013.01); *H05B 3/56* (2013.01); *H05B 2214/02* (2013.01)

(58) Field of Classification Search
CPC ................................. B64D 15/12; B64D 15/14
USPC ............................... 73/236, 237, 238, 861.68
See application file for complete search history.

(56) References Cited

U.S. PATENT DOCUMENTS

| | | | |
|---|---|---|---|
| 2,254,155 A | * | 8/1941 | Reichel ..................... G01F 1/46 73/861.68 |
| 2,984,107 A | | 5/1961 | Strieby et al. |
| 3,030,807 A | | 4/1962 | Scadron |
| 3,535,930 A | | 10/1970 | Rees |
| 3,400,583 A | | 9/1986 | Newport et al. |
| 5,337,602 A | | 8/1994 | Gibson |

(Continued)

FOREIGN PATENT DOCUMENTS

| | | |
|---|---|---|
| CA | 2745138 | 1/2012 |
| FR | 861520 | 11/1941 |
| FR | 882708 | 6/1943 |

OTHER PUBLICATIONS

European Patent Office, "Extended European Search Report for EP Application No. 16192297.6", Foreign Counterpart to U.S. Appl. No. 14/878,650, dated May 3, 2017, pp. 1-8, Published in: EP.

*Primary Examiner* — Ryan Walsh
(74) *Attorney, Agent, or Firm* — Fogg & Powers LLC

(57) ABSTRACT

An air data probe comprises an elongated body structure having a proximal end and a distal end, with the elongated body structure including an outer surface and an opposing inner surface that defines an interior channel. A probe tip is located at the distal end of the elongated body structure, with the probe tip including an outer surface and an inner surface that are contiguous with the outer an inner surfaces of the elongated body structure. The probe tip has an opening in communication with the interior channel that allows outside air to pass from the probe tip into the interior channel. An electrical heater cable is coupled to the elongated body structure and the probe tip. The electrical heater cable comprises a compact double layer helix portion coupled to the elongated body structure or the probe tip, or coupled to both the elongated body structure and the probe tip.

19 Claims, 5 Drawing Sheets

(56) References Cited

U.S. PATENT DOCUMENTS

| | | |
|---|---|---|
| 5,543,183 A | 8/1996 | Streckert et al. |
| 6,070,475 A | 6/2000 | Muehlhauser et al. |
| 6,134,972 A | 10/2000 | Streckert et al. |
| 6,191,528 B1 * | 2/2001 | Iwamura .................. H01J 1/22 |
| | | 313/270 |
| 9,116,162 B2 | 8/2015 | Leblond et al. |

* cited by examiner

AIR DATA PROBE WITH DOUBLE HELICAL COIL HEATER CABLE

BACKGROUND

Electrical heater coils are commonly used in air data probes for aircraft to protect against icing conditions. The heater coils are typically designed to provide de-icing of the air data probe before flight of an aircraft, and de-icing or anti-icing of the air data probe during flight. Current governmental icing regulations now require air data probes to be exposed to significantly more demanding icing conditions than in the past. More heat can be used to protect against these conditions. However, current air data probes are limited in how much power can be applied to the probe tip for anti-icing protection.

SUMMARY

An air data probe comprises an elongated body structure having a proximal end and a distal end, with the elongated body structure including an outer surface and an opposing inner surface that defines an interior channel. A probe tip is located at the distal end of the elongated body structure, with the probe tip including an outer surface and an inner surface that are contiguous with the outer an inner surfaces of the elongated body structure. The probe tip has an opening in communication with the interior channel that allows outside air to pass from the probe tip into the interior channel. An electrical heater cable is coupled to the elongated body structure and the probe tip. The electrical heater cable comprises a compact double layer helix portion coupled to the elongated body structure or the probe tip, or coupled to both the elongated body structure and the probe tip.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An air data probe is provided that includes an electrical heater cable, a portion of which is in a helical configuration. The heater cable is configured to deliver an increased amount of heat to a probe tip of the air data probe to protect against icing conditions, such as when an aircraft is on the ground or in flight.

The heater cable includes a compact double layer helix portion, which allows for an increased amount of heat to be delivered to the probe tip than in conventional single coil arrangements, thereby providing more protection during icing conditions. The double layer helix portion can also avoid the use of a 180 degree turn-around radius used in other conventional designs to wind the cable, first from a proximal end to a distal end and then back to the proximal end. The turn around radius in these conventional designs is a potential source of failure. Eliminating the turn around radius or making the turn around radius larger reduces stress in the heater cable during manufacturing and operation, increasing the life of the heater cable.

Further details of the present air data probe are described hereafter with reference to the drawings.

Figure 1:
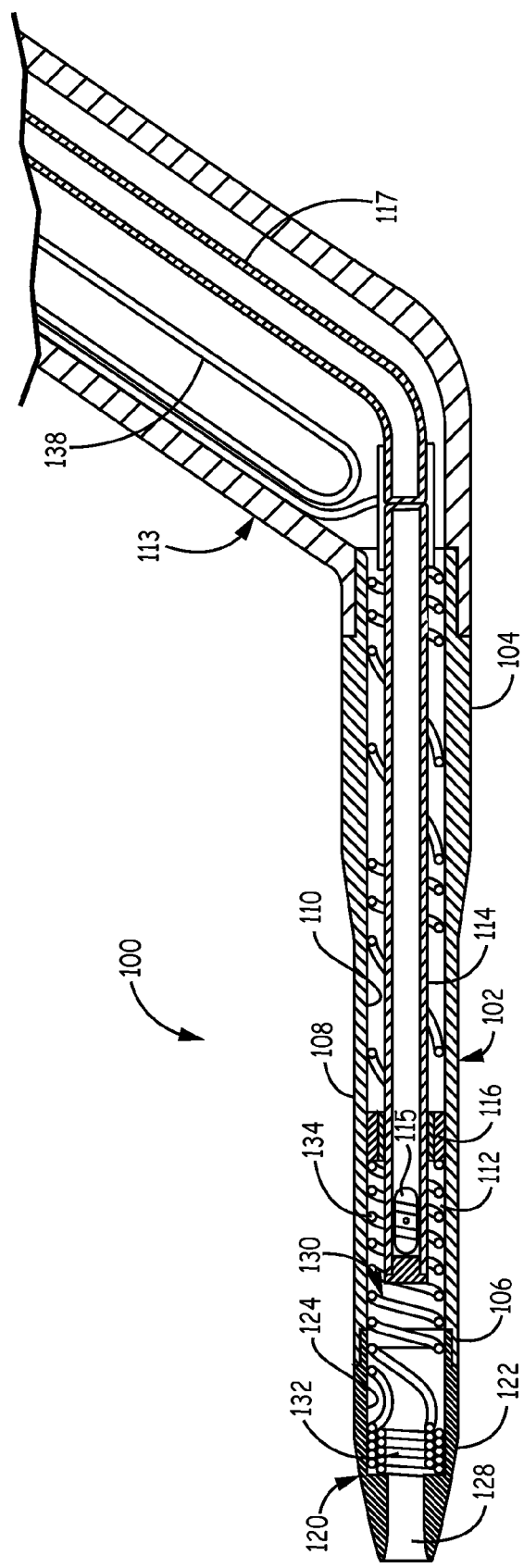
FIG. 1 is a cross-sectional side view of an air data probe that employs a double helical coil heater cable, according to one embodiment.

FIG. 1 illustrates an air data probe 100 according to one embodiment. The air data probe 100 generally comprises an elongated body structure 102 having a proximal end 104 and a distal end 106. The body structure 102 also has an outer surface 108 and an opposing inner surface 110, which defines an interior channel 112. A probe strut 113 is coupled to body structure 102 at proximal end 104. The probe strut 113 is configured to be attached to the fuselage of an aircraft.

Figure 2:
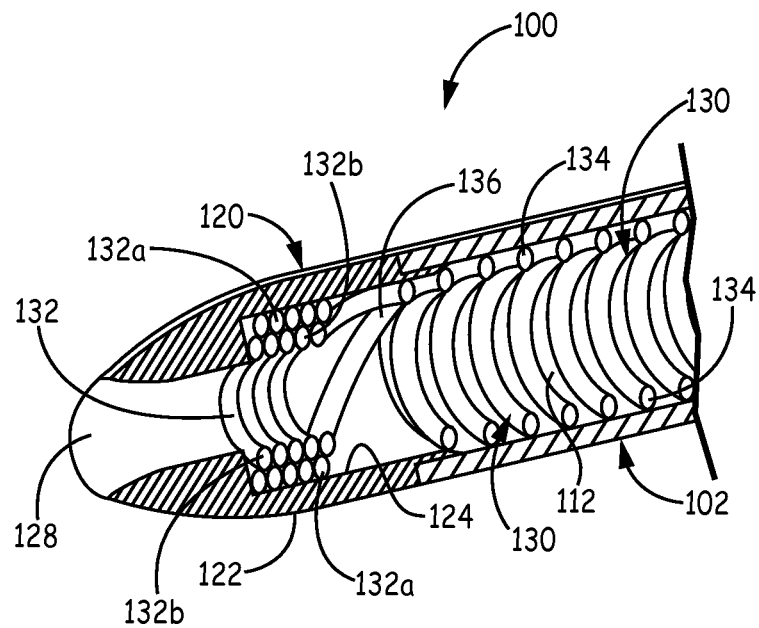
FIG. 2 is a cross-sectional perspective view of a distal portion of the air data probe of FIG. 1.

A first air pressure tube 114 is centrally located within interior channel 112 of body structure 102. The air pressure tube 114 has an opening 115 that communicates with interior channel 112. A dam structure 116 is coupled to inner surface 110 and supports air pressure tube 114 within interior channel 112 in a coaxial arrangement with body structure 102. The air pressure tube 114 is in communication with a second air pressure tube 117 located within probe strut 113. FIG. 2 depicts a distal portion of air data probe 100 without an air pressure tube.

A probe tip 120 is attached at distal end 106 of body structure 102. The probe tip 120 includes an outer surface 122 and an inner surface 124, which are respectively contiguous with outer surface 108 and an inner surface 110 of body structure 102. The probe tip 120 has an opening 128 in communication with interior channel 112. The opening 128 allows outside air to pass from probe tip 120 into interior channel 112, with the air then passing into air pressure tube 114 through opening 115.

The body structure 102 and probe tip 120 of air data probe 100 can be composed of one or more metallic materials, in particular metallic materials able to withstand extremes in temperature and environmental conditions experienced during the flight conditions of an aircraft. Suitable metallic materials include nickel and copper alloys, as well as other alloys of high thermal conductivity.

Figure 3:
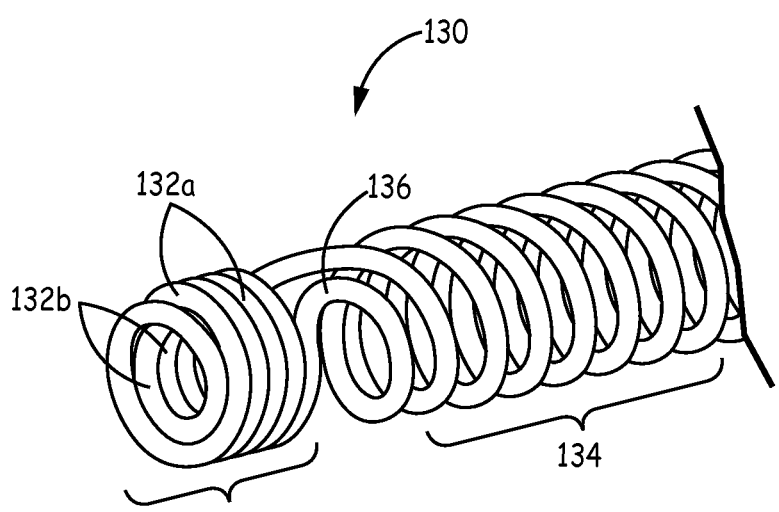
FIG. 3 is a perspective view of the double helical coil heater cable employed in the air data probe of FIG. 1.

The air data probe 100 also includes an electrical heater cable 130, a portion of which has a helical configuration. The heater cable 130 is coupled to body structure 102 and probe tip 120, such as by a brazing or soldering process. The heater cable 130 includes a compact double layer helix portion 132 coupled to probe tip 120. The heater cable 130 also includes a single layer helix portion 134 that is joined to double layer helix portion 132. The single layer helix portion 134 extends away from probe tip 120 toward proximal end 104. The heater cable 130 also includes an arbitrary cable layout portion 138, which is coupled to probe strut 113. The arbitrary cable layout portion 138 can take a variety of forms, at least a portion of which has a non-helical configuration. FIG. 3 illustrates further details of heater cable 130, shown separately from air data probe 100.

As shown more clearly in FIGS. 2 and 3, double layer helix portion 132 includes an outer spiral layer 132a joined to an inner spiral layer 132b in a coaxial arrangement. The outer spiral layer 132a and inner spiral layer 132b are arranged such that a coil turn-around section 136 is located on an opposite side of double layer helix portion 132 from opening 128 of probe tip 120. The configuration of double layer helix portion 132 provides an increased amount of heater cable 130 in probe tip 120. This allows for an increased amount of heat to be delivered to probe tip 120, thereby providing more protection to air data probe 100 during icing conditions.

The heater cable 130 is constructed of a heat conducting material, such as one or more metals or alloys. In one embodiment, heater cable 130 can be a coaxial cable having a central heater wire encased in an insulator that is surrounded by a steel casing. The heater cable 130 can be coupled to body structure 102 at a plurality of brazed or soldered joints.

In the embodiment of FIGS. 1 and 2, heater cable 130 is shown coupled to interior surfaces of air data probe 100 along elongated body structure 102 and probe tip 120. In this implementation, double layer helix portion 132 is coupled to inner surface 124 of probe tip 120, such by a brazing or soldering process. Likewise, single layer helix portion 134 is coupled to inner surface 110 of body structure 102, such as with a brazing or soldering process.

Figure 6:
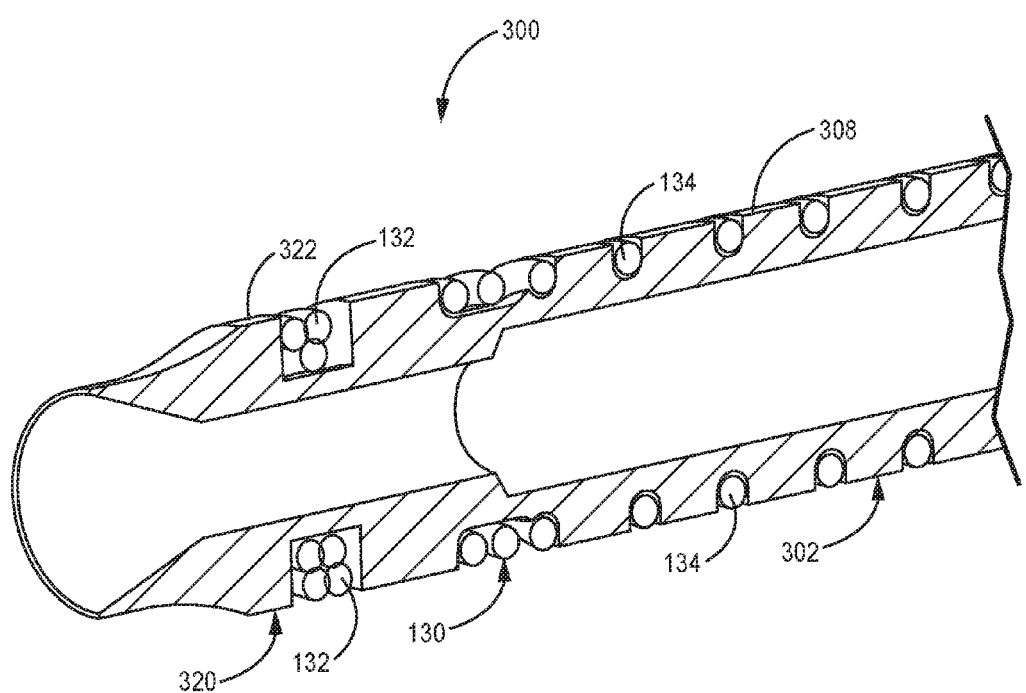
FIG. 6 is a cross-sectional perspective view of a distal portion of an air data probe that employs a double helical coil heater cable, according to an alternative embodiment.

In an alternative embodiment, heater cable 130 can be coupled to outer surfaces of air data probe 100. For example, double layer helix portion 132 can be coupled to outer surface 122 of probe tip 120, such by brazing or soldering. Likewise, single layer helix portion 134 can be coupled to outer surface 108 of body structure 102, such by brazing or soldering. An example of such an alternative embodiment is shown in FIG. 6 for an air data probe 300, which includes an elongated body structure 302 with an outer surface 308, and a probe tip 320 with an outer surface 322. The double layer helix portion 132 of heater cable 130 is coupled to outer surface 322 of probe tip 320. Likewise, single layer helix portion 134 is coupled to outer surface 308 of body structure 302.

Figure 7:
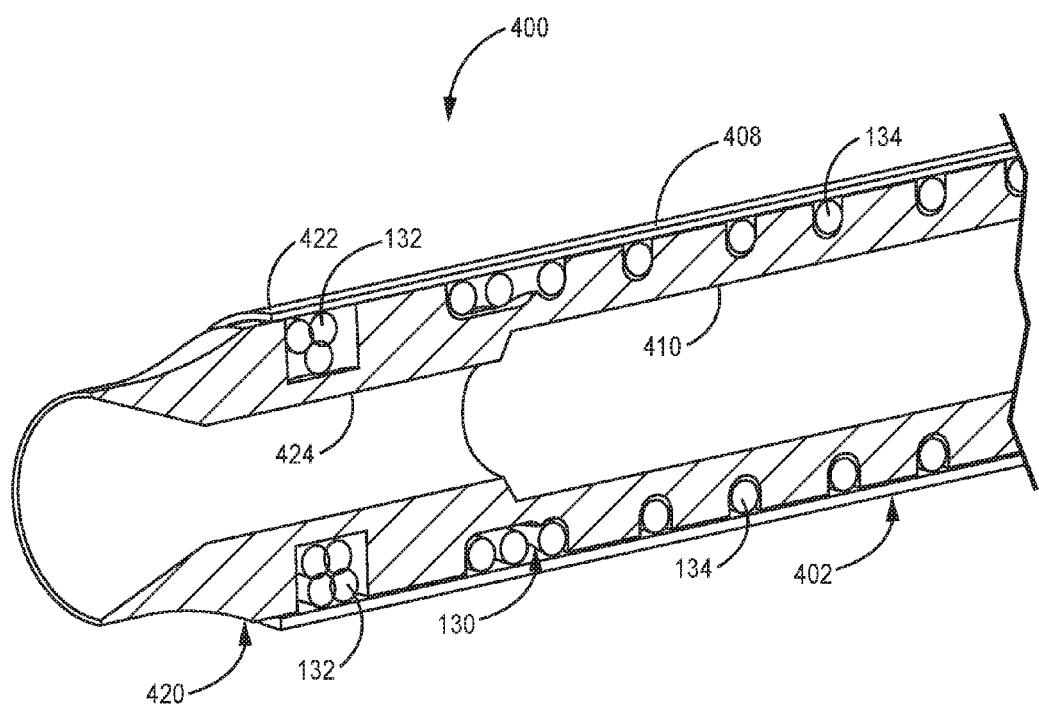
FIG. 7 is a cross-sectional perspective view of a distal portion of an air data probe that employs a double helical coil heater cable, according to another alternative embodiment.

In another alternative embodiment, heater cable 130 can be formed between inner and outer surfaces of body structure 102, and between inner and outer surfaces of probe tip 120, in a sandwich type structure. For example, double layer helix portion 132 can be formed between inner surface 124 and outer surface 122 of probe tip 120, such by a brazing or casting process. Likewise, single layer helix portion 134 can be formed between inner surface 110 and outer surface 108 of body structure 102, such as by a brazing or casting process. An example of such an alternative embodiment is shown in FIG. 7 for an air data probe 400, which includes an elongated body structure 402 with an outer surface 408 and an inner surface 410, and a probe tip 420 with an outer surface 422 and an inner surface 424. The double layer helix portion 132 of heater cable 130 is coupled between inner surface 424 and outer surface 422 of probe tip 420. Likewise, single layer helix portion 134 is coupled between inner surface 410 and outer surface 408 of body structure 402.

During operation, air data probe 100 is heated by double layer helix portion 132 providing heat to probe tip 120, single layer helix portion 134 providing heat along body structure 102, and arbitrary cable layout portion 138 providing heat to probe strut 113. The heater cable 130 is configured to provide sufficient heat to remove ice from air data probe 100 prior to flight of an aircraft, and to de-ice or prevent ice formation on air data probe 100 during flight of the aircraft.

Figure 4:
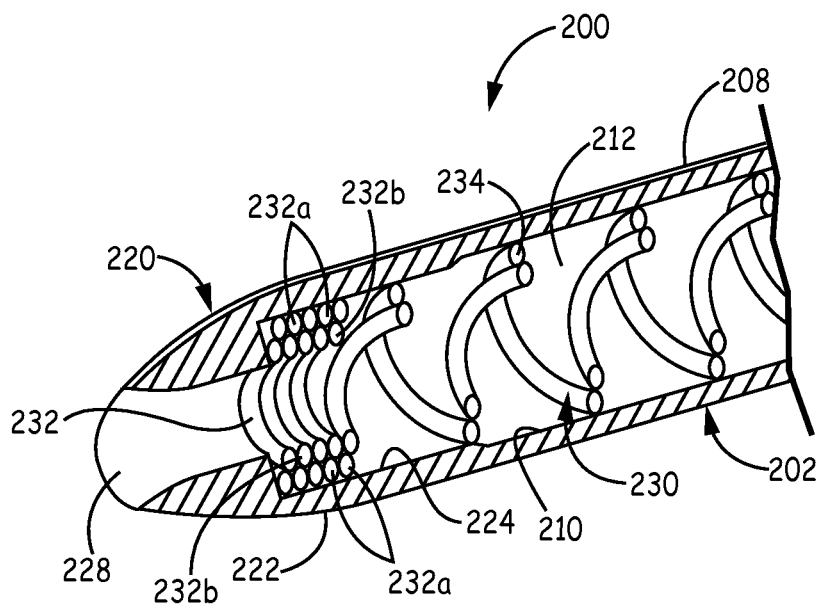
FIG. 4 is a cross-sectional perspective view of a distal portion of an air data probe that employs a double helical coil heater cable, according to another embodiment.

FIG. 4 illustrates a distal portion of an air data probe 200 according to another embodiment. The air data probe 200 comprises an elongated body structure 202 having an outer surface 208 and an opposing inner surface 210, which defines an interior channel 212. A probe tip 220 is integrally formed with body structure 202 at a distal end of air data probe 200. The probe tip 220 includes an outer surface 222 and an inner surface 224, which are contiguously formed with outer surface 208 and inner surface 210. The probe tip 220 has an opening 228 that allows outside air to pass from probe tip 220 into interior channel 212.

Figure 5:
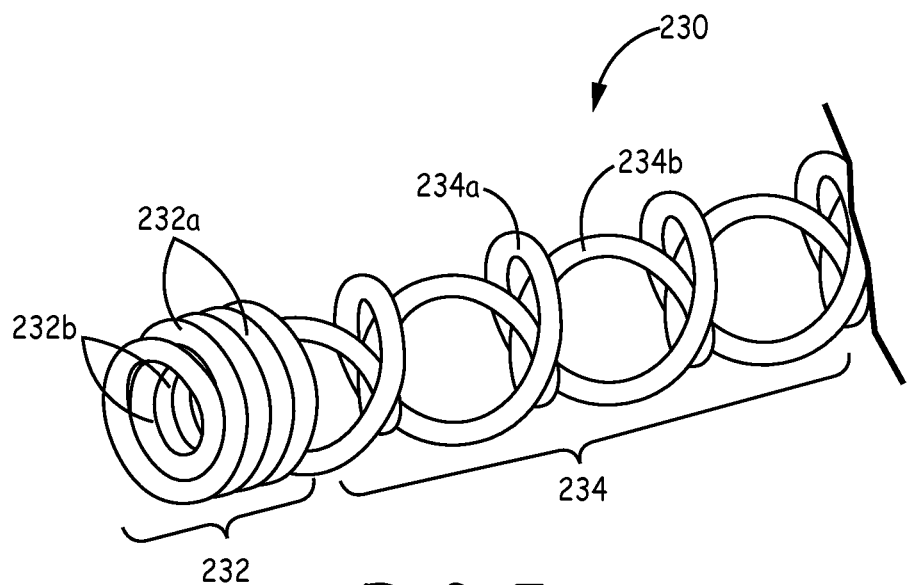
FIG. 5 is a perspective view of the double helical coil heater cable employed in the air data probe of FIG. 4.

The air data probe 200 also includes an electrical coil heater cable 230, which has a double helical configuration. The heater cable 230 is coupled to body structure 202 and probe tip 220, such as by a brazing or soldering process. The heater cable 230 includes a compact double layer helix portion 232 coupled to probe tip 220 to provide increased heat to probe tip 220. The heater cable 230 also includes an elongated double layer helix portion 234 joined to compact double layer helix portion 232, with elongated double layer helix portion 234 extending along body structure 202. FIG. 5 illustrates further details of heater cable 230, shown separately from air data probe 200.

The compact double layer helix portion 232 includes an outer spiral layer 232a joined to an inner spiral layer 232b in a coaxially dense arrangement. The elongated double layer helix portion 234 includes an outer spiral section 234a and an inner spiral section 234b in a coaxially relaxed arrangement. The heater cable 230 is configured such that outer spiral section 234a is joined to outer spiral layer 232a, and inner spiral layer 232b is joined to inner spiral section 234b. The heater cable 230 is configured such that outer spiral section 234a is joined to outer spiral layer 232a, and inner spiral layer 232b is joined to inner spiral section 234b.

In the embodiment of FIG. 4, heater cable 230 is shown coupled to interior surfaces of air data probe 200. In this implementation, compact double layer helix portion 232 is coupled to inner surface 224 of probe tip 220, such as by brazing or soldering. Likewise, elongated double layer helix portion 234 is coupled to inner surface 210 of body structure 202, such by brazing or soldering.

In an alternative embodiment, heater cable 230 can be coupled to outer surfaces of air data probe 200. For example, compact double layer helix portion 232 can be coupled to outer surface 222 of probe tip 220, such by brazing or soldering. Likewise, elongated double layer helix portion 234 can be coupled to outer surface 208 of body structure 202, such by brazing or soldering.

In another alternative embodiment, heater cable 230 can be formed between outer surface 208 and inner surface 210 of body structure 202 in a sandwich type structure. For example, compact double layer helix portion 232 can be formed between outer surface 222 and inner surface 224 of probe tip 220, such as by a brazing or casting process. Likewise, elongated double layer helix portion 234 can be formed between outer surface 208 and inner surface 210 of body structure 202, such as with a brazing or casting process.

During operation, air data probe 200 is heated by compact double layer helix portion 232 providing heat to probe tip 220, and elongated double layer helix portion 234 providing heat along body structure 202.

EXAMPLE EMBODIMENTS

Example 1 includes an air data probe comprising: an elongated body structure having a proximal end and a distal end, the elongated body structure including an outer surface and an opposing inner surface that defines an interior channel; a probe tip located at the distal end of the elongated body structure, the probe tip including an outer surface and an inner surface that are contiguous with the outer an inner surfaces of the elongated body structure, the probe tip having an opening in communication with the interior channel that allows outside air to pass from the probe tip into the interior channel; and an electrical heater cable coupled to the elongated body structure and the probe tip, the electrical heater cable comprising a compact double layer helix portion coupled to the elongated body structure or the probe tip, or coupled to both the elongated body structure and the probe tip.

Example 2 includes the air data probe of Example 1, wherein the compact double layer helix portion of the heater cable includes an outer spiral layer joined to an inner spiral layer in a coaxial arrangement.

Example 3 includes the air data probe of Example 2, wherein the outer spiral layer and the inner spiral layer are arranged such that a coil turn-around section is located on an opposite side of compact double layer helix portion from the opening of the probe tip.

Example 4 includes the air data probe of any of Examples 1-3, wherein the electrical heater cable further comprises a single layer helix portion joined to the compact double layer helix portion, the single layer helix portion extending along the elongated body structure toward the proximal end.

Example 5 includes the air data probe of any of Examples 1-4, further comprising a probe strut coupled to the elongated body structure at the proximal end, wherein the electrical heater cable further comprises an arbitrary cable layout portion coupled to the probe strut.

Example 6 includes the air data probe of any of Examples 1-2 and 5, wherein the electrical heater cable further comprises an elongated double layer helix portion joined to the compact double layer helix portion, the elongated double layer helix portion extending along the elongated body structure toward the proximal end.

Example 7 includes the air data probe of Example 6, wherein the elongated double layer helix portion includes an outer spiral section and an inner spiral section in a coaxial arrangement.

Example 8 includes the air data probe of Example 7, wherein the outer spiral section of the elongated double layer helix portion is joined with the outer spiral layer of the compact double layer helix portion, and the inner spiral section of the elongated double layer helix portion is joined to the inner spiral layer of the compact double layer helix portion.

Example 9 includes the air data probe of any of Examples 5-8, wherein the air data probe is heated with the compact double layer helix portion at the probe tip, is heated with the single layer helix portion along the elongated body structure, and is heated with the arbitrary cable layout portion along the probe strut.

Example 10 includes the air data probe of any of Examples 1-9, wherein the electrical heater cable is configured to provide sufficient heat to remove ice from the air data probe prior to flight of an aircraft, and to remove ice or prevent ice formation on the air data probe during flight of the aircraft.

Example 11 includes the air data probe of any of Examples 1-10, wherein the electrical heater cable is coupled to the inner surface of the elongated body structure, with the compact double layer helix portion coupled to the inner surface of the elongated body structure or the probe tip, or coupled to the inner surfaces of both the elongated body structure and the probe tip.

Example 12 includes the air data probe of any of Examples 1-10, wherein the electrical heater cable is coupled to the outer surface of the elongated body structure, with the compact double layer helix portion coupled to the outer surface of the elongated body structure or the probe tip, or coupled to the outer surfaces of both the elongated body structure and the probe tip.

Example 13 includes the air data probe of any of Examples 1-10, wherein the electrical heater cable is coupled between the inner and outer surfaces of the elongated body structure, with the compact double layer helix portion coupled between the inner and outer surfaces of the elongated body structure or the probe tip, or coupled between the inner and outer surfaces of both the elongated body structure and the probe tip.

Example 14 includes a method of fabricating an air data probe, the method comprising: forming an elongated body structure having a proximal end and a distal end, the elongated body structure including an outer surface and an opposing inner surface that defines an interior channel; forming or attaching a probe tip at the distal end of the elongated body structure, the probe tip including an outer surface and an inner surface that are contiguous with the outer an inner surfaces of the elongated body structure, the probe tip having an opening in communication with the interior channel that allows outside air to pass from the probe tip into the interior channel; forming a electrical heater cable that includes a compact double layer helix portion at a distal end thereof; coupling the electrical heater cable to the elongated body structure and the probe tip, wherein the compact double layer helix portion is coupled to the elongated body structure or the probe tip, or coupled to both the elongated body structure and the probe tip.

Example 15 includes the method of Example 14, wherein the electrical heater cable is coupled to the elongated body structure and the probe tip by brazing or soldering the electrical heater cable to the inner surfaces of the elongated body structure and the probe tip.

Example 16 includes the method of any of Examples 14-15, wherein the compact double layer helix portion is coupled by brazing or soldering the compact double layer helix portion to the inner surface of the elongated body structure or the probe tip, or to the inner surfaces of both the elongated body structure and the probe tip.

Example 17 includes the method of Example 14, wherein the electrical heater cable is coupled to the elongated body structure and the probe tip by brazing or soldering the electrical heater cable to the outer surfaces of the elongated body structure and the probe tip.

Example 18 includes the method of any of Examples 14 and 17, wherein the compact double layer helix portion is coupled by brazing or soldering the compact double layer helix portion to the outer surface of the elongated body structure or the probe tip, or to the outer surfaces of both the elongated body structure and the probe tip.

Example 19 includes the method of any of Example 14, wherein the electrical heater cable is coupled to the elongated body structure and the probe tip by brazing or casting the electrical heater cable between the inner and outer surfaces of the elongated body structure and the probe tip.

Example 20 includes the method of any of Examples 14 and 19, wherein the compact double layer helix portion is coupled by brazing or casting the compact double layer helix portion between the inner and outer surfaces of the elongated body structure or the probe tip, or between the inner and outer surfaces of both the elongated body structure and the probe tip.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An air data probe, comprising:
    an elongated body structure having a proximal end and a distal end, the elongated body structure including an outer surface and an opposing inner surface that defines an interior channel;
    a probe tip located at the distal end of the elongated body structure, the probe tip including an outer surface and an inner surface that are contiguous with the outer and inner surfaces of the elongated body structure, the probe tip having an opening in communication with the interior channel that allows outside air to pass from the probe tip into the interior channel; and
    an electrical heater cable coupled to the elongated body structure and the probe tip, the electrical heater cable comprising a compact double layer helix portion coupled to the elongated body structure or the probe tip, or coupled to both the elongated body structure and the probe tip;
    wherein the electrical heater cable further comprises:
        a single layer helix portion joined to the compact double layer helix portion by a coil turn-around section, the single layer helix portion extending along the elongated body structure toward the proximal end; or
        an elongated double layer helix portion joined to the compact double layer helix portion, the elongated double layer helix portion extending along the elongated body structure toward the proximal end.

2. The air data probe of claim 1, wherein the compact double layer helix portion of the heater cable includes an outer spiral layer joined to an inner spiral layer in a coaxial arrangement.

3. The air data probe of claim 2, wherein the outer spiral layer and the inner spiral layer are arranged such that the coil turn-around section is located on an opposite side of the compact double layer helix portion from the opening of the probe tip.

4. The air data probe of claim 2, wherein the elongated double layer helix portion includes an outer spiral section and an inner spiral section in a coaxial arrangement.

5. The air data probe of claim 4, wherein the outer spiral section of the elongated double layer helix portion is joined with the outer spiral layer of the compact double layer helix portion, and the inner spiral section of the elongated double layer helix portion is joined to the inner spiral layer of the compact double layer helix portion.

6. The air data probe of claim 1, further comprising a probe strut coupled to the elongated body structure at the proximal end, wherein the electrical heater cable further comprises an arbitrary cable layout portion coupled to the probe strut.

7. The air data probe of claim 6, wherein the air data probe is heated with the compact double layer helix portion at the probe tip, is heated with the single layer helix portion along the elongated body structure, and is heated with the arbitrary cable layout portion along the probe strut.

8. The air data probe of claim 1, wherein the electrical heater cable is configured to provide sufficient heat to remove ice from the air data probe prior to flight of an aircraft, and to remove ice or prevent ice formation on the air data probe during flight of the aircraft.

9. The air data probe of claim 1, wherein the electrical heater cable is coupled to the inner surface of the elongated body structure, with the compact double layer helix portion coupled to the inner surface of the elongated body structure or the probe tip, or coupled to the inner surfaces of both the elongated body structure and the probe tip.

10. The air data probe of claim 1, wherein the electrical heater cable is coupled to the outer surface of the elongated body structure, with the compact double layer helix portion coupled to the outer surface of the elongated body structure or the probe tip, or coupled to the outer surfaces of both the elongated body structure and the probe tip.

11. The air data probe of claim 1, wherein the electrical heater cable is coupled between the inner and outer surfaces of the elongated body structure, with the compact double layer helix portion coupled between the inner and outer surfaces of the elongated body structure or the probe tip, or coupled between the inner and outer surfaces of both the elongated body structure and the probe tip.

12. A method of fabricating an air data probe, the method comprising:
    forming an elongated body structure having a proximal end and a distal end, the elongated body structure including an outer surface and an opposing inner surface that defines an interior channel;
    forming or attaching a probe tip at the distal end of the elongated body structure, the probe tip including an outer surface and an inner surface that are contiguous with the outer and inner surfaces of the elongated body structure, the probe tip having an opening in communication with the interior channel that allows outside air to pass from the probe tip into the interior channel;
    forming an electrical heater cable that includes a compact double layer helix portion at a distal end thereof, and a single layer helix portion joined to the compact double layer helix portion by a coil turn-around section; and
    coupling the electrical heater cable to the elongated body structure and the probe tip, wherein the compact double layer helix portion is coupled to the elongated body structure or the probe tip, or coupled to both the elongated body structure and the probe tip.

13. The method of claim 12, wherein the electrical heater cable is coupled to the elongated body structure and the probe tip by brazing or soldering the electrical heater cable to the inner surfaces of the elongated body structure and the probe tip.

14. The method of claim 12, wherein the compact double layer helix portion is coupled by brazing or soldering the compact double layer helix portion to the inner surface of the elongated body structure or the probe tip, or to the inner surfaces of both the elongated body structure and the probe tip.

15. The method of claim 12, wherein the electrical heater cable is coupled to the elongated body structure and the probe tip by brazing or soldering the electrical heater cable to the outer surfaces of the elongated body structure and the probe tip.

16. The method of claim 12, wherein the compact double layer helix portion is coupled by brazing or soldering the compact double layer helix portion to the outer surface of the elongated body structure or the probe tip, or to the outer surfaces of both the elongated body structure and the probe tip.

17. The method of claim 12, wherein the electrical heater cable is coupled to the elongated body structure and the probe tip by brazing or casting the electrical heater cable between the inner and outer surfaces of the elongated body structure and the probe tip.

18. The method of claim 12, wherein the compact double layer helix portion is coupled by brazing or casting the compact double layer helix portion between the inner and outer surfaces of the elongated body structure or the probe tip, or between the inner and outer surfaces of both the elongated body structure and the probe tip.

19. An air data probe, comprising:

an elongated body structure having a proximal end and a distal end, the elongated body structure including an outer surface and an opposing inner surface that defines an interior channel;

a probe tip located at the distal end of the elongated body structure, the probe tip including an outer surface and an inner surface that are contiguous with the outer and inner surfaces of the elongated body structure, the probe tip having an opening in communication with the interior channel that allows outside air to pass from the probe tip into the interior channel; and an electrical heater cable coupled to the outer surfaces of the elongated body structure and the probe tip, the electrical heater cable comprising a compact double layer helix portion coupled to the outer surfaces of the elongated body structure or the probe tip, or coupled to the outer surfaces of both the elongated body structure and the probe tip.

* * * * *